Patented May 19, 1953

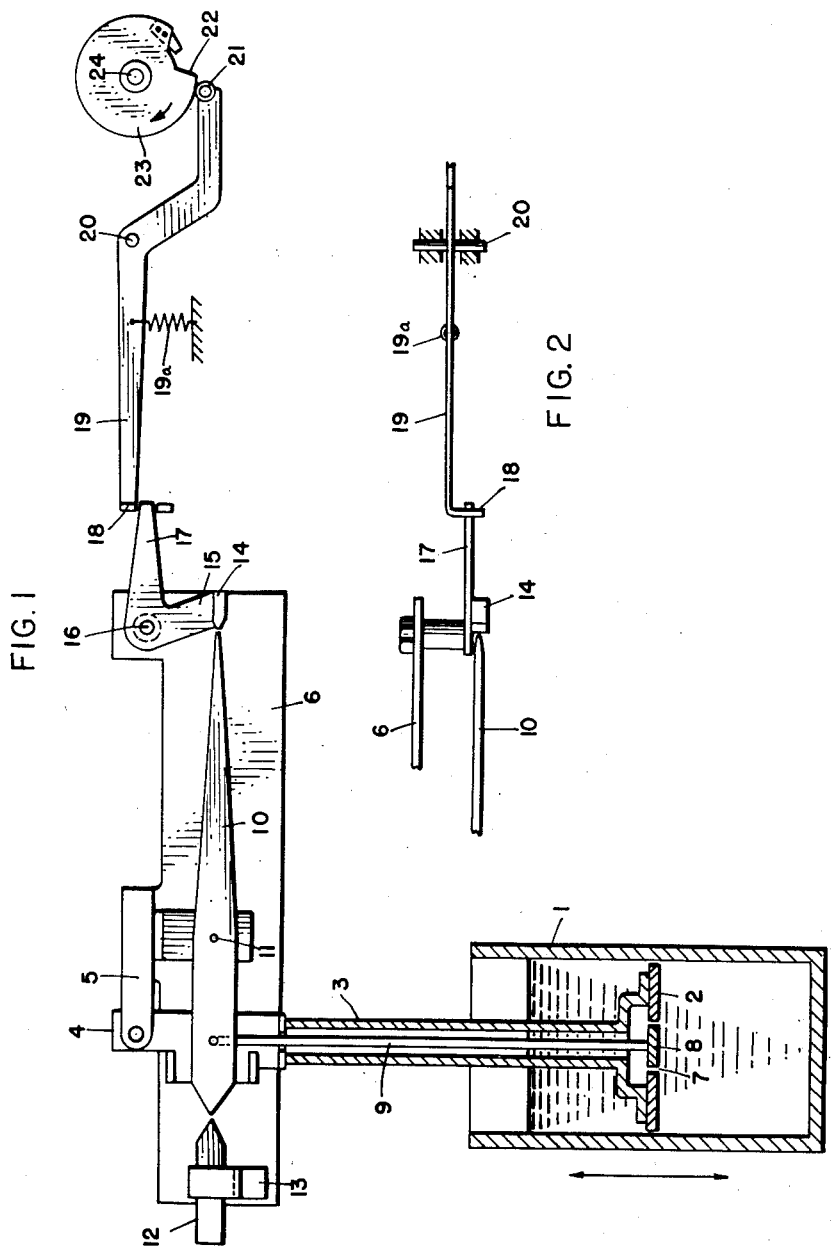

2,639,136

UNITED STATES PATENT OFFICE 2,639,136

FLUID PRESSURE OPERATED LOCKING DEVICE FOR REGISTERING APPARATUS OF WEIGHING SCALES

Adrianus van Duyn, Hillegersberg, Rotterdam, Netherlands, assignor to U. S. Slicing Machine Company, Inc., La Porte, Ind., a corporation of Indiana Application June 26, 1951, Serial No. 233,507
In the Netherlands July 8, 1950

1 Claim. (Cl. 265—5)

This invention relates to a fluid pressure, e. g., hydraulic or pneumatic, locking device for controlling a registering apparatus of a weighing device, in which two piston bodies of different sizes are arranged in a medium, preferably a fluid surrounded by a cylindrical vessel, said piston bodies and the vessel being adapted to move relatively with respect to each other under the influence of a weighing mechanism, whereby as a result of the movement of the smaller piston body in the fluid, a locking member leaves its position of equilibrium and thus prevents actuation of the registering apparatus until the smaller piston body is at rest.

A similar locking device is known in which, adjacent the cylindrical vessel which contains the fluid and the larger piston-shaped body, there is a protruding part which houses the smaller piston-shaped body that controls the locking member.

In practice it has been found that the application of two cylindrical vessels, as provided in said known locking device, renders the device rather expensive. The main object of the present invention is to simplify a device of this type and consequently to make it cheaper.

Having this object in view, according to the invention, the smaller piston body is mounted for movement in a continuous bore of the larger piston body. The simplicity of such arrangement is conspicuous because only a single cylindrical vessel is required, and consequently the use of a protruding outer part of such vessel for housing the smaller piston body is avoided.

In a practical embodiment of the invention, the cylindrical vessel is attached to a movable part of the weighing mechanism and can move along the larger piston-shaped body, in which the continuous bore for the smaller piston-shaped body has been coaxially provided, said smaller piston being connected to the rockable locking member by means of a rod which goes through the hollow piston rod of the stationary piston.

An embodiment of the fluid pressure locking device of the present invention is shown in the accompanying drawing.

Fig. 1 is an elevation partly in section; and

Fig. 2 is a partial plan view of one form of the device.

A cylinder 1 containing the fluid, preferably oil, is connected with a movable part of a weighing machine (not shown).

A large piston 2 is secured to a part 4 by means of a hollow piston rod 3, said part 4 being pivoted to a fork 5 of the stationary frame 6 of the weighing apparatus. Thus, the piston 2 can adjust itself laterally with respect to the inner wall of the cylinder 1 and thus prevent abrasion along said wall. The piston 2 can be considered as a substantally stationary part with respect to the cylinder 1, whereas the cylinder has an up-and-down movement due to the connection with the weighing mechanism. Consequently the piston 2 stands still and the cylinder 1 is movable.

The large piston 2 has a continuous coaxial bore 7 in which a small piston 8 moves with some clearance, said piston being connected with a locking member 10 by means of a rod 9 passing through the hollow piston rod 3 of the larger piston 2. The member 10 is rotatable about a stationary pin 11 secured to the frame 6 of the weighing device, and is kept in stable equilibrium by a magnet 12 secured in a holder 13 on the frame 6.

The opposite end of the locking member 10 cooperates with a cam 14 on a bellcrank lever 15 which pivots about a pin 16. A fork 18 of a double armed lever 19 rests upon the long arm 17 of the bellcrank lever 15, said lever 19 being journaled on a pin 20. A spring 19a, which is anchored at one end, is secured to the lever 19 so that the fork 18 always follows the movement of the arm 17 and is pressed against said arm. The other end of the lever 19 is provided with a roller 21 which is arranged to enter a peripheral recess 22 of a disc 23. To effect registration, said disc 23 can be rotated by a crank (not shown) mounted on the shaft 24 of the disc. The rotatable shaft 24 is adapted to operate registering apparatus of conventional and previously known construction.

The operation of the device is as follows:

In the position shown in the drawings, in which the weighing mechanism is in equilibrium, clockwise rotation of the lever 15 is prevented because the cam 14 is opposite the extremity of the locking member 10 and the end of the latter blocks such rotation. The roller 21 of the lever 19 is at this time free from the recess 22 so that upon rotation of the disc 23 and shaft 24 by means of the attached crank registration will take place in a known manner.

If, on the contrary, the weighing mechanism connected with cylinder 1 is moving, an overpressure above or under the large piston 2 occurs, whereby the small piston 8 is displaced in the bore 7, and said displacement is transferred to the locking member 10 by means of the rod 9 which moves upwardly and downwardly about the pin 11. As a result, the end of the locking member 10 is no longer opposite the cam 14 of the lever 15. Hence, during rotation of the disc 23, the roller 21 enters the recess 22 and registration is prevented.

The invention is hereby claimed as follows:

A weighing apparatus having a vessel adapted to contain a fluid, two pistons arranged one within the other in the vessel, said vessel being adapted to move relatively with respect to said pistons under the influence of a weighing mechanism, one of said pistons being relatively movable with respect to the other in response to the pressure of said fluid, a pivotally mounted locking member connected with said movable piston for responsive movement, a rotatable shaft adapted to operate a registering apparatus, a stop mechanism mounted for rotation with said shaft, and mechanism controlled by said locking member and having means selectively engageable with said stop member to prevent rotation of said shaft only when said movable piston is in motion.

ADRIANUS van DUYN.

References Cited in the file of this patent

FOREIGN PATENTS

| Number | Country | Date |
|--------|---------|------|
| 253,286 | Switzerland | Feb. 29, 1948 |